United States Patent

Katoh et al.

[11] Patent Number: 6,105,336
[45] Date of Patent: Aug. 22, 2000

[54] INSULATING DOUBLE-GLAZING UNIT AND VACUUM DOUBLE-GLAZING UNIT

[75] Inventors: Hidemi Katoh, Itami; Masao Misonou, Nishinomiya, both of Japan

[73] Assignee: Nippon Sheet Glass Co., Ltd., Osaka, Japan

[21] Appl. No.: 09/051,818

[22] PCT Filed: Aug. 9, 1997

[86] PCT No.: PCT/JP97/03172

§ 371 Date: Apr. 17, 1998

§ 102(e) Date: Apr. 17, 1998

[87] PCT Pub. No.: WO98/11032

PCT Pub. Date: Mar. 19, 1998

[30] Foreign Application Priority Data

Sep. 12, 1996 [JP] Japan .................................. 8-242372

[51] Int. Cl.[7] ...................................................... E04C 2/34
[52] U.S. Cl. ............................................ 52/786.13; 428/34
[58] Field of Search ..................................... 52/2.16, 171.3, 52/203, 204.62, 783.1, 786.1, 786.4, 786.13, 788.1; 428/34

[56] References Cited

U.S. PATENT DOCUMENTS

| | | | |
|---|---|---|---|
| 4,081,934 | 4/1978 | Franz | 52/786.13 X |
| 4,226,063 | 10/1980 | Chenel | 52/786.1 X |
| 4,687,687 | 8/1987 | Terneu et al. | 52/171.3 X |
| 4,950,344 | 8/1990 | Glover et al. | 52/786.1 X |
| 5,027,574 | 7/1991 | Phillip | 52/786.13 X |
| 5,270,084 | 12/1993 | Parker | 52/786.13 X |
| 5,270,091 | 12/1993 | Krysiak et al. | 52/788.1 X |
| 5,657,607 | 8/1997 | Collins et al. | 52/786.13 |

FOREIGN PATENT DOCUMENTS 2097456 11/1982 United Kingdom .................. 52/786.1

*Primary Examiner*—Richard Chilcot
*Attorney, Agent, or Firm*—Fulbright & Jaworski, LLP

[57] ABSTRACT

The present invention relates to a heat-insulating multiple glazing and a vacuum multiple glazing. Conventionally, this type of glass does not provide sufficient heat-insulating performance. And, it has been necessary to form the heat-insulating multiple glazing thick, in order to enhance the heat-insulating performance. The present invention comprises a first vacuum multiple glazing (2) including two sheet glasses (3), (4) having peripheries thereof sealed and a plurality of layers of spacer (5) disposed within a gap therebetween, with the gap being depressurized; and a second vacuum multiple glazing (2) or an ordinary sheet glass (10) overlapped with the first multiple glazing (2) with a gap relative thereto and having the periphery thereof sealed with a sealing material (12), with the gap being charged with dry air or rare gas. Thus, it is possible to enhance the heat-insulating performance, without increasing the thickness of the entire heat-insulating multiple glazing.

20 Claims, 2 Drawing Sheets

INSULATING DOUBLE-GLAZING UNIT AND VACUUM DOUBLE-GLAZING UNIT

This application is a Section 371 of PCT/JP96/03172.

TECHNICAL FIELD

The present invention relates to a heat-insulating multiple glazing and vacuum multiple glazing for use in a building construction or the like.

BACKGROUND ART

For constructions such as a house or a building, there is a need for saving energy consumption through improvement in the heating or cooling efficiency. As the efficiency of heating or cooling depends on the heat-insulating performance or air-tightness of the construction, heat-insulating wall materials and heat-insulating window glasses have been developed.

However, a heat-insulating window glass generally has a higher heat-through ratio than a heat-insulating wall material, hence a lower insulating performance. Accordingly, in order to achieve energy consumption saving, it is necessary to enhance the heat-insulating performance of the heat-insulating window glass. As a heat-insulating window glass having a higher heat-insulating performance, a multiple glazing is known. This multiple glazing is shown in FIG. 5.

FIG. 5 shows a cross-sectional construction of a conventional heat-insulating multiple glazing. This heat-insulating multiple glazing 100 includes two sheets of sheet glasses 101, 102 overlapped with each other with spacers 103 interposed therebetween sealing the peripheries of the plates and also with dry air being charged in the intermediate gap. This heat-insulating multiple glazing may achieve a heat-insulating performance equivalent to a heat-through ratio of 3.0–4.0 kcal/m$^2$hr° C.

On the other hand, the heat-insulating wall material provides a heat-through ratio of 1/10 (0.3–0.4 kcal/m$^2$hr° C.) of that of the heat-insulating multiple glazing 100. Accordingly, enhancement of the heat-insulating performance of the heat-insulating multiple glazing may lead to energy consumption saving. Following measures (a)–(d) are known for enhancing the heat-insulating performance of the heat-insulating multiple glazing 100.

(a) Low-radiating films are formed on inner surfaces of the sheet glasses 101, 102 of the heat-insulating multiple glazing 100, so that the low-radiating films may reflect infrared beam, thereby improving the heat-insulating performance.

(b) The dry air charged between the sheet glasses 101, 102 is replaced by rare gas so as to restrict convection between the sheet glasses 101, 102. As the rare gas, gas such as argon or krypton which hardly causes convection is employed, so that the convection between the sheet glasses 101, 102 may be appropriately restricted.

(c) The heat-insulating performance may be enhanced by increasing the number of the sheet glasses 101, 102 of the heat-insulating multiple glazing 100 or by increasing the gap between the sheet glasses 101, 102.

The heat-insulating performance may be enhanced by depressurizing the gap between the sheet glasses 101, 102 of the heat-insulating multiple glazing 100 thus restricting air convection.

However, in the case of (a), it is necessary for the low-radiating film to have light-through property so as to allow introduction of light into the indoor space. Then, in order to satisfy both of the low-radiating property and the light-through property, it is necessary to restrict the heat-through ratio of the heat-insulating multiple glazing 100 to about 1.0–1.5 kcal/m$^2$hr° C. Hence, this value is still insufficient when compared with the heat-through ratio: 0.3–0.4 kcal/m$^2$hr° C. of the heat-insulating wall material.

In the case of (b), in combination with the low-radiating film, the heat-through ratio of the heat-insulating multiple glazing 100 may be reduced to 1.0 kcal/m$^2$hr ° C. However, this is still insufficient when compared with the heat-through property: 0.3–0.4 kcal/m$^2$hr° C. of the heat-insulating wall material.

In the case of (c), the heat-through ratio of the heat-insulating multiple glazing 100 may be reduced to 0.5 kcal/m$^2$hr° C. However, the increase in the number of the sheet glasses 101, 102 will result in increase in the thickness of the heat-insulating multiple glazing 100. Then, the cost of the window frame for use with the heat-insulating multiple glazing 100 will increase. Further, the increase in the number of sheet glasses 101, 102 will result also in the cost of the heat-insulating multiple glazing 100.

In the case of (d), the heat-through ratio of the heat-insulating multiple glazing 100 may be reduced to 1.0kcal/m$^2$hr° C. approximately. Accordingly, if the low-radiating films are formed on the heat-insulating multiple glazing 100, it may be possible to reduce sufficiently the heat-through ratio without inviting increase in the thickness of the heat-insulating multiple glazing 100.

However, in order to allow the heat-insulating multiple glazing 100 in a building construction, it is necessary to maintain the gap between the sheet glasses 101, 102 under the evacuated depressurized condition for an extended period of time; and the gap between the sheet glasses needs to be firmly sealed by a high-temperature treatment (above 400° C.) like the welding.

Further, if the low-radiating film is formed on the surface of the heat-insulating multiple glazing, there is the risk of the low-radiating film being damaged. So, it is preferred that the low-radiating film be formed on the inside of the heat-insulating multiple glazing. Accordingly, it becomes necessary to form the low-radiating film before the sealing of the peripheries of the two sheet glasses.

Incidentally, most of such low-radiating films are vulnerable to high temperature, so that they cannot effectively resist the high temperature used in the welding treatment for sealing the heat-insulating multiple glazing 100. A low-radiating film capable of effectively resisting the high temperature is known which is formed of tin oxide doped with fluorine formed by the thermal decomposition method. This provides a radiation ratio of 0.15. Therefore, if this low-radiating film is formed on the heat-insulating multiple glazing, the heat-through ratio of the heat-insulating multiple glazing 100 will hardly be reduced further from 1.0 kcal/m$^2$hr° C. Hence, the heat-through ratio of the heat-insulating multiple glazing 100 is still insufficient, when compared with the heat-through ratio of the heat-insulating wall material ranging between 0.3–0.4 kcal/m$^2$hr° C.

Then, in view of the above-described problems of the prior art, an object of the present invention is to provide art capable of enhancing the heat-insulating performance without increasing the thickness of the heat-insulating multiple.

SUMMARY OF THE INVENTION

The above-noted object is achieved by the invention set forth in the claims.

First, a heat-insulating multiple glazing, according to the characterizing features of the present invention, comprises:

a first vacuum multiple glazing including two sheet glasses having peripheries thereof sealed and a plurality of layers of spacer disposed within a gap therebetween, with the gap being depressurized; and a second vacuum multiple glazing or an ordinary sheet glass overlapped with the first multiple glazing with a gap relative thereto and having the periphery thereof sealed with a sealing material, with the gap being charged with dry air or rare gas.

The heat-insulating multiple glazing employs at least one vacuum multiple glazing. This vacuum multiple glazing includes two sheet glasses disposed with a predetermined gap therebetween, which gap is depressurized. The vacuum multiple glazing having the above construction has substantially same thickness as one ordinary sheet glass for use in a heat-insulating multiple glazing, yet provides a higher heat-insulting performance. And, this vacuum multiple glazing, like one ordinary sheet glass, is assembled in the heat-insulating multiple glazing.

With the above, it has become possible to enhance the heat-insulting performance without increasing the thickness of the heat-insulating multiple glazing.

Incidentally, as the rare gas, helium, neon, argon, krypton, xenon or the like may be employed. However, it is preferred to employ argon, krypton, xenon or the like which hardly cause convection.

Further, according to the present invention, a low-radiating film having a heat-through ratio not exceeding 1 kcal/m$^2$hr° C. may be formed on either one or both of an opposing inner face of the further vacuum multiple glazing or the ordinary sheet glass opposing the first vacuum multiple glazing and an opposing inner face of the first vacuum multiple glazing opposing the second vacuum multiple glazing or the ordinary sheet glass.

With this heat-insulating multiple glazing, dry air or rare gas is charged between the vacuum multiple glazing and the other sheet glass. For this reason, it is possible to maintain the balance between the outside and the inside of heat-insulating multiple glazing, so that the peripheries of the two sheet glasses may be sealed with elastic sealing material. Therefore, there is no need for welding by a high-temperature (above 400° C.) treatment of the peripheries of the two sheet glasses, as is the case with the vacuum multiple glazing.

With the above, it is possible to form a low-radiating film having no heat resistance (having a radiating ratio of 0.15 or less and a heat-through ratio of 1.0 kcal/m$^2$hr° C. or less) on the heat-insulating multiple glazing (i.e. at least one of the opposing inner face of the further vacuum multiple glazing or the ordinary sheet glass opposing to the vacuum multiple glazing and the inner opposing face of the vacuum multiple glazing opposing to the further vacuum multiple glazing or the ordinary sheet glass), so that the heat-insulating performance of the heat-insulating multiple glazing may be further improved.

Incidentally, the low-radiating film having heat resistance may be formed in advance on the opposing inner face of the vacuum multiple glazing. In this case, however, the following respects (i), (ii) need to be considered.

(i) The low-radiating film must be limited to those which have a radiating ratio of 0.15 or lower and whose heat-through ratio hardly drop any further from 1.0 kcal/m$^2$hr° C.

(ii) If a forcible attempt is made to improve the heat-insulating performance of the vacuum multiple glazing by means of a low-radiating film, there develops a temperature difference between the front side and the rear side of the sheet glass. And, if the difference is significant, this may lead to breakage.

Furthermore, according to the characterizing features of a vacuum multiple glazing, the glazing comprises two sheet glasses with a plurality of spacers disposed in a gap therebetween and having the peripheries thereof sealed, the gap being depressurized by means of evacuating or the like, wherein said each sheet glass has a thickness not exceeding 1.5 mm and the spacers are disposed with a pitch not exceeding 15 mm.

By reducing the disposing pitch of the spacers while forming thin the sheet glass which constitutes the vacuum multiple glazing, it is possible to form the vacuum multiple glazing thin without breaking the sheet glasses. Accordingly, it has become possible to selectively adapt the vacuum multiple glazing for a particular application.

DETAILED DESCRIPTION

Modes of embodying the present invention will be described in details with reference to the accompanying drawings. Incidentally, the drawings should be viewed in the direction of the reference marks.

Figure 1:
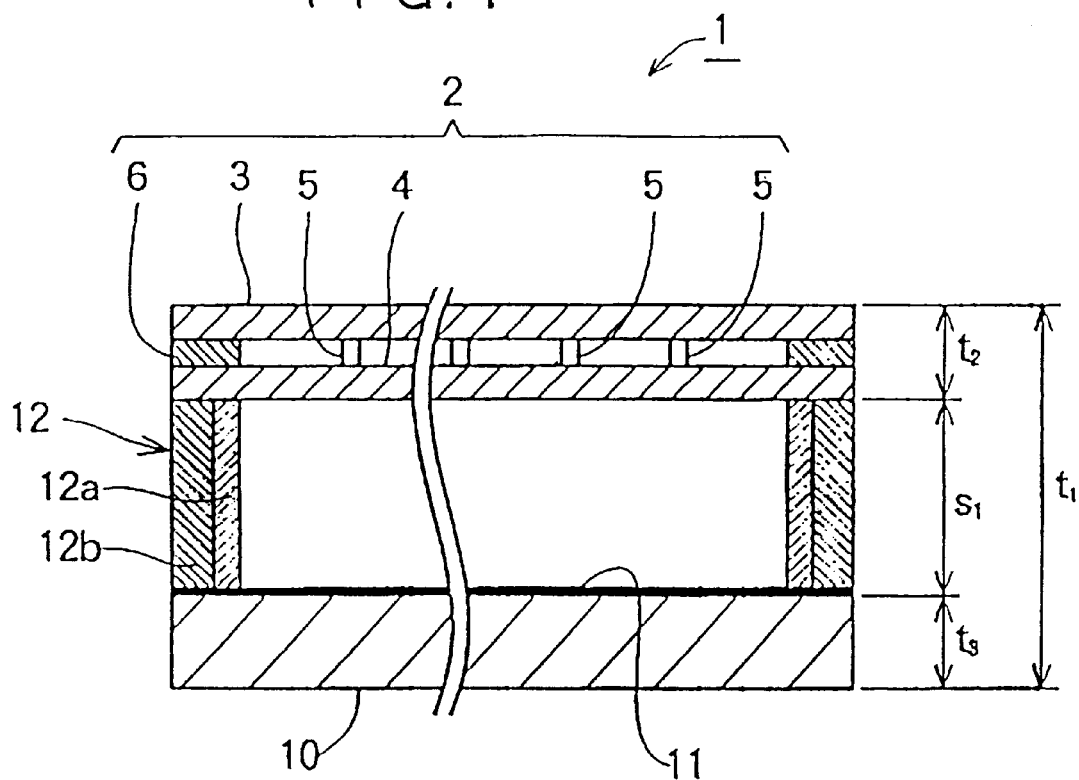
FIG. 1 is a section view of a heat-insulating multiple glazing relating to a first embodiment.

FIG. 1 shows a cross sectional construction of a heat-insulating multiple glazing relating to a first embodiment.

A heat-insulating multiple glazing 1 includes a vacuum multiple glazing 2 having an overall thickness of $t_1$ and acting as a first vacuum multiple glazing, an ordinary (not a vacuum multiple glazing, but of an ordinary type) sheet glass 10 overlapped with this vacuum multiple glazing 2 with a gap therebetween, and a sealing material 12 for sealing the peripheries of the vacuum multiple glazing 2 and the ordinary sheet glass 10. Between the sheet glass 10 and the vacuum multiple glazing 2, there is charged dry air or rare gas.

The vacuum multiple glazing 2 includes two thin sheet glasses 3, 4 having a thickness denoted by $t_2$ and disposed with a gap therebetween, a plurality of spacers 5 interposed between these two thin sheet glasses 3, 4 and a solder glass 6 fused and sealingly fixed to the peripheries of the two thin sheet glasses 3, 4 at a high temperature of 400–500° C. And, the glazing is placed under a depressurized condition by air present between the two thin sheet glasses 3, 4 being evacuated.

The ordinary sheet glass 10 has a thickness denoted with $t_3$ and on an opposing inner face thereof facing the vacuum multiple glazing 2, there is formed a low-radiating film 11. This low-radiating film 11 reflects infrared beam thus reducing a heat-through ratio of the sheet glass 10, so that the heat-through ratio of the heat-insulating multiple glazing will not exceed 1 kcal/m$^2$hr° C.

The sealing material 12 consists e.g. of a primary sealing material 12a and a secondary sealing material 12b. The primary sealing material 12a may be formed preferably of isobutylene-isoprene rubber or the like, and the secondary sealing material 12b may be formed preferably of sulphide sealant (or silicone sealant). These materials may be used at the normal temperature.

Incidentally, the gap $s_1$ between the vacuum multiple glazing 2 and the ordinary sheet glass 10 is preferably 6–20 mm. If the gas $s_1$ exceeds 20 mm, there tends to occur convection of the dry air or rare gas charged into this gap $s_1$, thereby to reduce the heat-insulating performance. If the gap $s_1$ is not greater than 6 mm, the layer of the dry air or rare gas charged into this gap $s_1$ is too thin, thus being unable to enhance the heat-insulating performance.

In the heat-insulating multiple glazing 1 according to the first embodiment, there has been described the case where the low-radiating film 11 is formed only on the opposing inner face of the ordinary sheet glass 10 facing the vacuum multiple glazing 2. Instead, the following three other arrangements are also possible.

(1) The low-radiating film 11 is formed on the opposing inner face of the ordinary sheet glass 10 opposing the vacuum multiple glazing 2. In addition, another low-radiating film 11 is formed on the opposing inner face of the thin sheet glass 4 constituting the vacuum multiple glazing 2 opposing the ordinary sheet glass 10.

(2) Without forming the low-radiating film 11 on the opposing inner face of the ordinary sheet glass 10 opposing the vacuum multiple glazing 2, the low-radiating film 11 is formed only on the opposing inner face of the thin sheet glass 4 constituting the vacuum multiple glazing 2 opposing the ordinary sheet glass 10.

(3) The low-radiating film 11 is formed on neither of the opposing inner faces of the ordinary sheet glass 10 and the thin sheet glass 4 of the vacuum multiple glazing 2.

Furthermore, in place of the ordinary transparent sheet glass 10, a wire glass or sheet glass rendered non-transparent may be employed.

Figure 2:
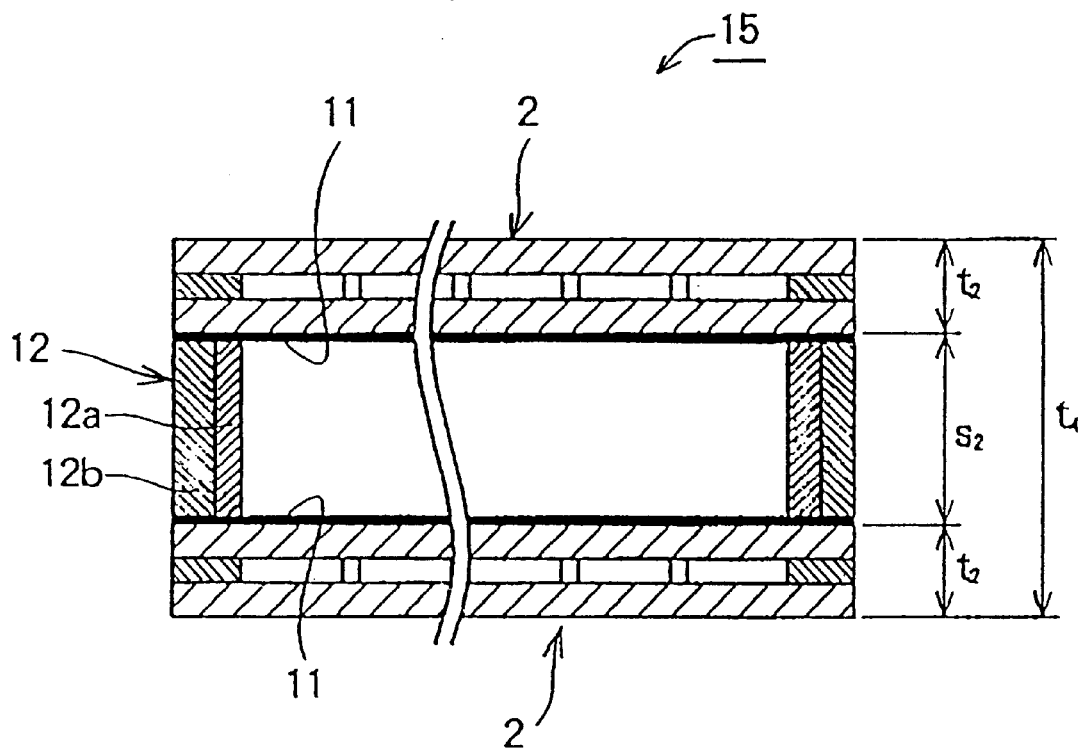
FIG. 2 is a section view of a heat-insulating multiple glazing relating to a second embodiment.

Next, a cross-sectional construction of a heat-insulating multiple glazing relating to a second embodiment is shown in FIG. 2.

This heat-insulating multiple glazing 15 has an entire thickness $t_4$ and includes two vacuum multiple glazings 2, 2 used as first and second vacuum multiple glazings, and a sealing material 12 sealing the peripheries of these vacuum multiple glazings 2, 2. Between the two vacuum multiple glazings 2, 2, there is charged dry air or rare gas.

In this second embodiment, there has been described the heat-insulating multiple glazing 15 using the two vacuum multiple glazings 2, 2. Instead, the heat-insulating multiple glazing may be constituted of more than three vacuum multiple glazings 2. However, although increase in the number of the vacuum multiple glazings 2 may reduce the heat-through ratio, this will also increase the thickness of the heat-insulating multiple glazing. Thus, an appropriate selection needs to be made depending on the purpose of the use.

Incidentally, the vacuum multiple glazing 2 employed in the first and second embodiments (see FIG. 1, FIG. 2) has the thickness $t_2$ of about 6 mm. The reason why the thickness $t_2$ is set at about 6 mm is as follows. In general, with the vacuum multiple glazing 2, it is necessary for the thin sheet glasses 3, 4 to have a thickness of at least 3 mm approximately to ensure strength and also for the two thin sheet glasses 3, 4 to have a gap of at least 0.2 mm to enhance the heat-insulating performance.

On the other hand, there is a demand to employ a vacuum multiple glazing 2 thinner than 6 mm or a vacuum multiple glazing 2 of a lower cost. However, since the gap between these two thin sheet glasses 3, 4 of the vacuum multiple glazing 2 is depressurized, there will be a risk of breakage of the thin sheet glasses 3, 4 if the thin sheet glasses 3, 4 have a thickness less than 3 mm.

Then, through repeated trial productions, the present inventors have striven to find out appropriate conditions allowing manufacture of a thin vacuum multiple glazing. The construction of this thin vacuum multiple glazing will be described next with reference to FIGS. 3, 4.

Figure 3:
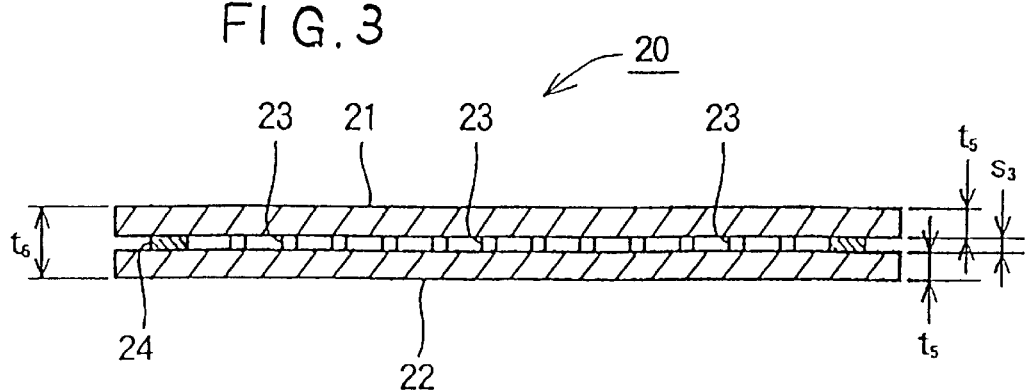
FIG. 3 is a section view of a heat-insulating multiple glazing relating to a third embodiment.

FIG. 3 shows a cross-sectional construction of a vacuum multiple glazing relating to a third embodiment.

This vacuum multiple glazing 20 has a thickness denoted with $t_6$ and includes two thin sheet glasses 21, 22 disposed with a gap therebetween, a plurality of spacers 23 interposed between the two thin sheet glasses 21, 22 and a solder glass 24 for tightly sealing the peripheries between the two thin sheet glasses 21, 22. Each of the two thin sheet glasses 21, 22 is an ordinary glass; and the solder glass 24 is fused by a high temperature (400–500° C.) for tightly sealing between the thin sheet glasses 21, 22. The thin sheet glasses 21, 22 have a thickness denoted with $t_5$ and a gap between the two thin sheet glasses 21, 22 is denoted with $s_3$. The gap between the two sheet glasses 21, 22 is depressurized to $10^{-3}$ Torr or lower. With this, it is possible to restrict air convection sufficiently. Accordingly, like the ordinary heat-insulating multiple glazing charged with dry air or rare gas, the heat-through ratio may be reduced reliably, without using any thick air layer.

Figure 4:
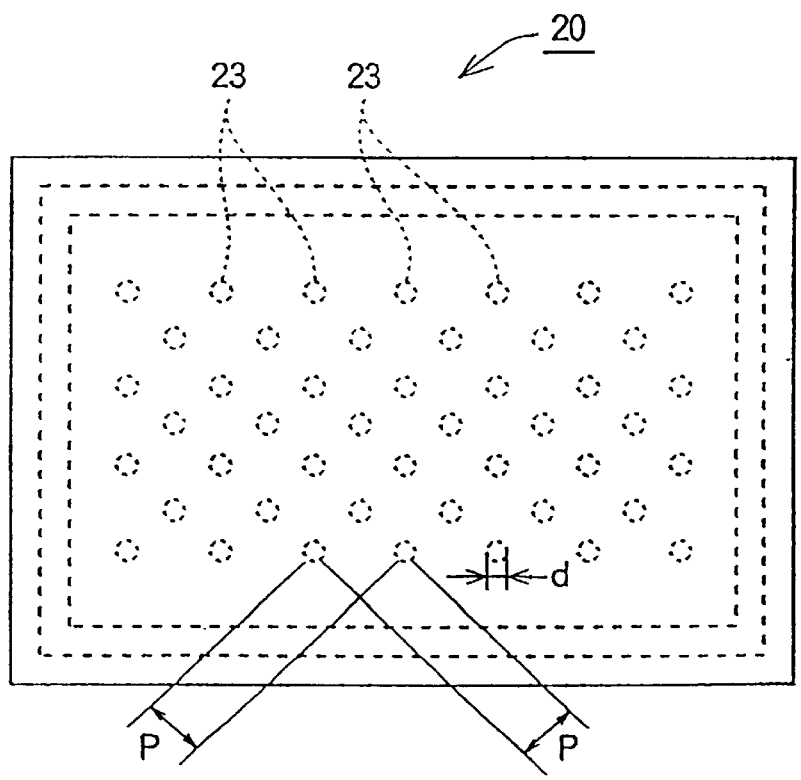
FIG. 4 is a plan view of the heat-insulating multiple glazing of FIG. 3.
Figure 5:
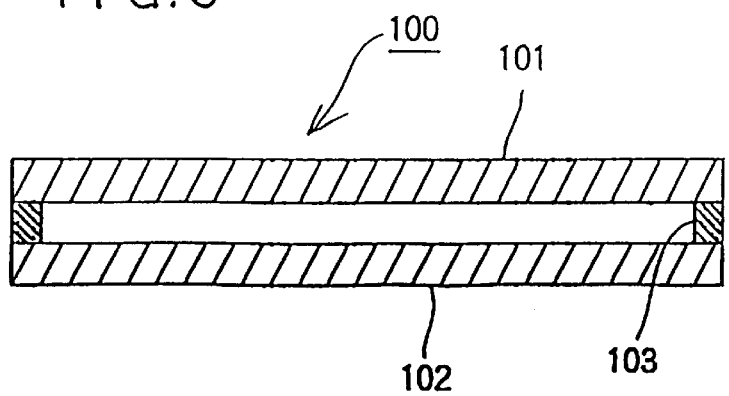
FIG. 5 is a section view of a conventional heat-insulating multiple glazing.

FIG. 4 shows the construction in plan view of the vacuum multiple glazing relating to the third embodiment.

In the vacuum multiple glazing 20, between the two thin sheet glasses 21, 22 (only the numeral 21 is shown), there are interposed a plurality of spacers 23. These spacers 23 are stainless steel column members having a diameter d and are arranged on a grating having a disposing pitch p. In FIG. 4, the plurality of spacers 23 are arranged along a diagonal grating pattern relative to the sheet glass. However, the invention is not limited to this arrangement, and the spacers may be arranged along an ordinary grating pattern, i.e. a grating pattern parallel with the peripheries of the sheet glass.

In this construction, by forming the thickness $t_5$ of the thin plate glasses 21, 22 thin (see FIG. 3) and also reducing the disposing pitch p of the spacers 23, breakage of the thin sheet glasses 21, 22 may be avoided. Specifically, this may be done by providing each sheet glass with a thickness not exceeding 1.5 mm and setting the disposing pitch of the spacers at a value not exceeding 15 mm. With these, it has become possible to manufacture the vacuum multiple glazing 20 having the reduced thickness $t_6$ (see FIG. 3).

In this third embodiment, there has been described the vacuum multiple glazing 20 employing the spacers 23 formed of stainless steel. Instead of this, spacers formed of glass or ceramics may be employed.

Since glass has a low heat transfer coefficient, increase of the heat-through ratio may be restricted even if the number of the spacers is increased. Further, as glass has a superior light transmission property, the increase in the number of the spacers will not deteriorate the appearance.

In addition, a low-radiating film may be formed on at least one of the surfaces of the thin sheet glasses 21, 22 constituting the vacuum multiple glazing 20. By forming the low-radiating film on the face of the thin sheet glass 21, 22 after forming the vacuum multiple glazing 20, it is possible to form the low-radiating film vulnerable to a high temperature. Needless to say, a low-radiating film having a reflecting ratio no greater than 0.15 and resistance against high temperature may be formed before the formation of the vacuum multiple glazing 20.

Incidentally, the vacuum multiple glazing 20 may solely be used in a windowpane or the like, or may be used in the heat-insulating multiple glazings 1, 15 shown in FIGS. 1 and 2, respectively. Namely, this glazing may be employed in place of the vacuum multiple glazing 2 of the heat-insulating multiple glazings shown in FIG. 1 and FIG. 2. With the above, it becomes advantageously possible to obtain a heat-insulating multiple glazing without increasing the entire thickness thereof.

DETAILED DESCRIPTION OF PREFERRED EMBODIMENTS

Next, the first embodiment relating to the present invention will be described with reference to Table 1.

TABLE 1

| sheet glass | thickness ($t_3$) | 6.0 mm |
| --- | --- | --- |
|  |  | low-radiating film |
| vacuum | thickness ($t_2$) | 6.0 mm |
| multiple glazing | heat-through ratio | 1.0 kcal/m$_2$hr° C. |
| gap | $S_1$ | 15.0 mm |
|  | charged gas | dry air |
| sealing |  | double sealing with isobutylene-isoprene rubber and sulfide sealant |
| heat-insulating | thickness ($t_1$) | 27.0 mm |
| multiple glazing | heat-through ratio | about 0.7 kcal/m$^2$hr° C. |

The vacuum multiple glazing 2 shown in FIG. 1 has the thickness $t_2$ of 6.0 mm and a heat-through ratio of about 1.0 kcal/m$^2$hr° C. The ordinary sheet glass 10 has the thickness $t_3$ of 6.0 mm, and has the low-radiating film 11 formed on the inner face thereof. The gap $S_1$ between the vacuum multiple glazing 2 and the ordinary sheet glass 10 is 15 mm, and the peripheries between the vacuum multiple glazing 2 and the ordinary sheet glass 10 was double-sealed with isobutylene-isoprene rubber and sulfide sealant. And, between these, dry air was charged. The heat-insulating glass 1 manufactured under the above conditions had a thickness $t_1$ of 27.0 mm and a heat-through ratio of about 0.7kcal/m$^2$hr° C., which value is smaller than the target value of 1.0 kcal/m$^2$hr° C.

Next, the second embodiment relating to the present invention will be described with reference to Table 2.

TABLE 2

| vacuum | thickness ($t_2$) | 6.0 mm |
| --- | --- | --- |
| multiple glazing | heat-through ratio | 1.0 kcal/m$^2$hr° C. |
|  |  | low-radiating film |
| gap | $S_1$ | 15.0 mm |
|  | charged gas | rare gas |
| sealing |  | double sealing with isobutylene-isoprene rubber and sulfide sealant |
| heat-insulating | thickness ($t_4$) | 27.0 mm |
| multiple glazing | heat-through ratio | about 0.37 kcal/m$^2$hr° C. |

The vacuum multiple glazings 2, 2 shown in FIG. 2 has the thickness $t_2$ of 6.0 mm and a heat-through ratio of about 1.0 kcal/m$^2$hr° C. The low-radiating films 11, 11 are formed respectively on the opposing inner faces of the two vacuum multiple glazings 2, 2 opposed to each other. The gap $S_2$ between the two vacuum multiple glazings 2, 2 is 15 mm, and the peripheries between these was double-sealed with isobutylene-isoprene rubber and sulfide sealant. And, into this gap, rare gas was charged. The heat-insulating glass 15 manufactured under the above conditions had a thickness $t_4$ of 27.00 mm and a heat-through ratio of about 0.37kcal/m$^2$hr° C., which value is smaller than the target value of 1.0 kcal/m$^2$hr° C.

Next, the third embodiment relating to the present invention will be described with reference to Table 3.

TABLE 3

| thin sheet glass | thickness ($t_5$) | 1.5 mm |
| --- | --- | --- |
| gap | $S_3$ | 0.2 mm |
|  | depressurized | 10$^{-3}$ Torr |
| sealing |  | fused sealing with low melting-point glass |
| spacers | diameter (d) | 0.5 mm |
|  | height | 0.2 mm |
|  | material | stainless steel |
|  | disposing pitch | arranged on grating pattern with disposing pitch of 15 mm |
| vacuum multiple | thickness ($t_6$) | 3.2 mm |
| glazing | heat-through ratio | about 2.55 kcal/m$^2$hr° C. |
|  | sound-proof performance | equivalent to JIS sound-proof performance Class 25 |

The thin sheet glasses 21, 22 shown in FIG. 3 had the peripheries thereof fuse-sealed with low melting-point glass and has a thickness $t_5$ of 1.5 mm and a gap $S_3$ of 0.2 mm. And, this gap $S_3$ was depressurized to be lower than 10$^{-3}$ Torr.

The spacer 23 is a stainless piece having a diameter d of 0.5 mm, and these spacers were arranged on a diagonal grating pattern with a disposing pitch p of 15 mm. The spacer 23 has a height of 0.2 mm.

The vacuum multiple glazing 20 manufactured under the above conditions had a thickness $t_6$ of 3.2 mm and a heat-through ratio of about 2.55 kcal/m$^2$hr° C., which thickness $t_6$ is about ½ of that of the convention.

Incidentally, as for the sound-proof performance, a value equivalent to JIS (Japanese Industrial Standards) sound-proof performance Class 25 was achieved.

We claim:

1. A heat-insulating multiple glazing comprising:
    a first vacuum multiple glazing including two sheets of glass having peripheries thereof sealed and a plurality of spacers disposed within a gap therebetween, the gap being depressurized;
    a second vacuum multiple glazing or an ordinary sheet glass, said second vacuum multiple glazing or ordinary sheet glass being overlapped with the first multiple glazing with a gap relative thereto and having the periphery thereof sealed with a sealing material, said gap being charged with dry air or rare gas;
    a low-radiating film formed on either one or both of an opposing inner face of the second vacuum multiple glazing or the ordinary sheet glass opposing the first vacuum multiple glazing and an opposing inner face of the first vacuum multiple glazing opposing the second vacuum multiple glazing or the ordinary sheet glass.

2. The heat-insulating multiple glazing according to claim 1, wherein said low-radiating film has a heat-through ratio not exceeding 1 kcal/m$^2$hr° C.

3. The heat-insulating multiple glazing according to claim 1, wherein said gap within said first vacuum multiple glazing is depressurized to be 10$^{-3}$ Torr or lower.

4. The heat-insulating multiple glazing according to claim 2, wherein said gap within said first vacuum multiple glazing is depressurized to be 10$^{-3}$ Torr or lower.

5. The heat-insulating multiple glazing according to claim 1, wherein said gap between the first vacuum multiple glazing and the second vacuum multiple glazing or the ordinary sheet glass is from 6 to 20 mm.

6. The heat-insulating multiple glazing according to claim 2, wherein said gap between the first vacuum multiple glazing and the second vacuum multiple glazing or the ordinary sheet glass is from 6 to 20 mm.

7. The heat-insulating multiple glazing according to claim 3, wherein said gap between the first vacuum multiple glazing and the second vacuum multiple glazing or the ordinary sheet glass is from 6 to 20 mm.

8. The heat-insulating multiple glazing according to claim 4, wherein said gap between the first vacuum multiple glazing and the second vacuum multiple glazing or the ordinary sheet glass is from 6 to 20 mm.

9. The heat-insulating multiple glazing according to claim 1, wherein said sealing material includes a primary sealing material and a secondary sealing material, the primary sealing material being isobutylene-isoprene rubber, the secondary sealing material being sulphide sealant or silicone sealant.

10. The heat-insulating multiple glazing according to claim 2, wherein said sealing material includes a primary sealing material and a secondary sealing material, the primary sealing material being isobutylene-isoprene rubber, the secondary sealing material being sulphide sealant or silicone sealant.

11. The heat-insulating multiple glazing according to claim 3, wherein said sealing material includes a primary sealing material and a secondary sealing material, the primary sealing material being isobutylene-isoprene rubber, the secondary sealing material being sulphide sealant or silicone sealant.

12. The heat-insulating multiple glazing according to claim 5, wherein said sealing material includes a primary sealing material and a secondary scaling material, the primary sealing material being isobutylene-isoprene rubber, the secondary sealing material being sulphide sealant or silicone sealant.

13. The heat-insulating multiple glazing according to claim 1 wherein the first and second vacuum multiple glazings respectively have a thickness of about 6 mm.

14. The heat-insulating multiple glazing according to claim 2 wherein the first and second vacuum multiple glazings respectively have a thickness of about 6 mm.

15. The heat-insulating multiple glazing according to claim 3 wherein the first and second vacuum multiple glazings respectively have a thickness of about 6 mm.

16. The heat-insulating multiple glazing according to claim 5 wherein the first and second vacuum multiple glazings respectively have a thickness of about 6 mm.

17. The heat-insulating multiple glazing according to claim 9 wherein the first and second vacuum multiple glazings respectively have a thickness of about 6 mm.

18. The heat-insulating multiple glazing according to claim 10 wherein the first and second vacuum multiple glazings respectively have a thickness of about 6 mm.

19. The heat-insulating multiple glazing according to claim 1 wherein each said sheet glass has a thickness of less than or equal to 1.5 mm and the spacers are disposed with a pitch not greater than 15 mm.

20. The heat-insulating multiple glazing according to claim 2 wherein each said sheet glass has a thickness of less than or equal to 1.5 mm and the spacers are disposed with a pitch not greater than 15 mm.

* * * * *

UNITED STATES PATENT AND TRADEMARK OFFICE
CERTIFICATE OF CORRECTION

PATENT NO. : 6,105,336
DATED : Aug. 22, 2000
INVENTOR(S) : Katoh et al

It is certified that error appears in the above-identified patent and that said Letters Patent is hereby corrected as shown below:

In the cover page, in the section entitled PCT Filed:, change "August 9, 1997" to -- September 8, 1997 --.

Signed and Sealed this

First Day of May, 2001

Attest:

NICHOLAS P. GODICI

Attesting Officer     Acting Director of the United States Patent and Trademark Office